(12) United States Patent
Truett et al.

(10) Patent No.: US 11,715,988 B2
(45) Date of Patent: Aug. 1, 2023

(54) SYSTEM AND METHODS FOR MULTIPLE CONFIGURATIONS TO COOL AN ELECTRIC MOTOR

(71) Applicant: ABB Schweiz AG, Baden (CH)

(72) Inventors: Matthew Truett, Simpsonville, SC (US); Christopher A. Stockton, Greenville, SC (US); Steven D. Browne, Shelby, NC (US)

(73) Assignee: ABB Schweiz AG, Baden (CH)

( * ) Notice: Subject to any disclaimer, the term of this patent is extended or adjusted under 35 U.S.C. 154(b) by 365 days.

(21) Appl. No.: 16/843,678

(22) Filed: Apr. 8, 2020

(65) Prior Publication Data
US 2021/0320552 A1 Oct. 14, 2021

(51) Int. Cl.
*H02K 5/20* (2006.01)
*H02K 9/06* (2006.01)
*H02K 9/18* (2006.01)
*H02K 1/32* (2006.01)

(52) U.S. Cl.
CPC ............. *H02K 5/20* (2013.01); *H02K 1/32* (2013.01); *H02K 5/207* (2021.01); *H02K 9/18* (2013.01); *H02K 9/06* (2013.01); *H02K 2213/09* (2013.01)

(58) Field of Classification Search
CPC .......... H02K 5/18; H02K 5/20; H02K 5/207; H02K 9/02; H02K 9/04; H02K 9/06; H02K 9/08; H02K 9/10; H02K 9/12; H02K 9/14; H02K 9/16; H02K 9/18; H02K 2213/09
See application file for complete search history.

(56) References Cited

U.S. PATENT DOCUMENTS

| 5,780,946 | A | * | 7/1998 | Nakamura | H02K 9/16 |
| | | | | | 310/58 |
| 5,925,947 | A | * | 7/1999 | Kajiwara | H02K 9/18 |
| | | | | | 310/58 |
| 6,731,036 | B2 | * | 5/2004 | Ghiotto | H02K 11/33 |
| | | | | | 310/58 |

(Continued)

FOREIGN PATENT DOCUMENTS

| EP | 2605379 A1 | 6/2013 | |
| JP | 2014087178 A | * 5/2014 | ............... H02K 9/12 |

(Continued)

OTHER PUBLICATIONS

European Patent Office, International Search Report in International Patent Application No. PCT/IB2021/052906, 5 pp. (dated Jun. 30, 2021).

(Continued)

*Primary Examiner* — Eric Johnson
(74) *Attorney, Agent, or Firm* — Leydig, Voit & Mayer, Ltd.

(57) ABSTRACT

An electrical motor can be selectively configured to operator between a number of different configurations to alter the cooling arrangement. The electric motor can include an enclosure aperture disposed through the motor enclosure that can be selectively sealed or opened by a removable cover plate. When the cover plate is installed, the electric motor can operate with a TEFC configuration in which an internal cooling circuit is isolated from an external fluid source. When the cover plate is removed, the internal airflow can thermally interact with an external airflow from an external fluid source.

16 Claims, 6 Drawing Sheets

(56) References Cited

U.S. PATENT DOCUMENTS

| | | | | |
|---|---|---|---|---|
| 2003/0184172 A1* | 10/2003 | Ghiotto | ............. | H02K 11/33 |
| | | | | 310/58 |
| 2006/0055256 A1* | 3/2006 | Kreitzer | ............. | H02K 9/18 |
| | | | | 310/59 |
| 2010/0033042 A1* | 2/2010 | Hassett | ............. | H02K 9/18 |
| | | | | 310/64 |
| 2013/0221774 A1* | 8/2013 | Agostini | ............. | H02K 9/14 |
| | | | | 310/64 |

FOREIGN PATENT DOCUMENTS

| WO | WO 2006/029361 A1 | 3/2006 |
|---|---|---|
| WO | WO 2012/045358 A1 | 4/2012 |
| WO | WO 2019/170490 A1 | 9/2019 |

OTHER PUBLICATIONS

European Patent Office, Written Opinion in International Patent Application No. PCT/IB2021/052906, 7 pp. (dated Jun. 30, 2021).

* cited by examiner

SYSTEM AND METHODS FOR MULTIPLE CONFIGURATIONS TO COOL AN ELECTRIC MOTOR

BACKGROUND

Electric motors are often designated by their enclosure type, which in part designates how the motor is constructed to interact with the operating environmental. For example, totally enclosed electric motors have a housing or motor enclosure that isolates the internal motor components from the ambient environment to protect against contaminants like dust, airborne particles, and moisture. To remove the heat generated by the internal components due to electrical resistance in the conductors and windings, eddy currents induced by electromagnetic interaction, bearing friction, and the like, total enclosed motors are sometimes equipped with an external fan mounted to a portion of the motor shaft protruding from the enclosure and arranged to direct air over the enclosure. Thermal energy is transferred by conduction from the internal components to the surrounding enclosure and away from the motor by the airflow from the fan via convection. External cooling fins may be formed on the enclosure to facilitate heat transfer to the environment. These motors may be designated as total enclosed, fan cooled (TEFC) motors in accordance with the IC 411 designation. In some TEFC motors, to further promote heat transfer, an internal cooling circuit may be included that utilizes an internal fan to circulate air within the motor enclosure and distribute the thermal energy therein for more efficient conduction to the exterior of the enclosure.

Another category of motor enclosures are designed to allow external air to enter the motor enclosure and flow among the internal components to remove heat by convection. The heated air is thereafter exhausted from the enclosure. The external air may be drawn into the motor through apertures disposed through the motor enclosure by an internal fan mounted on the motor shaft, such as in an open drip proof (ODP) configuration, or in motors designated according to IC 01. External air may also be directly introduced into the motor by a separately powered fan, such as in a totally enclosed, forced ventilation (TEFV) configuration or in motors designated according to IC 06 and IC 17 designations. The present disclosure is directed to the construction and functionality of motor enclosure configurations to provide improved thermal cooling of electric motors.

BRIEF SUMMARY

The disclosure describes an electric motor having a motor enclosure that is configurable between different arrangements for cooling the motor during operation. In one configuration, the electric motor may have a TEFC arrangement with and an internal cooling circuit for circulating an internal airflow inside the motor enclosure. In another configuration, the electric motor can be configured so that the internal airflow thermally interacts with airflow from an external fluid source. Switching configurations can be accomplished by removing a cover plate that seals an enclosure aperture disposed in the motor enclosure. Thermal interaction between the internal airflow and the external fluid source can occur, for example, by directing a portion of the internal airflow to a heat exchanger or by directing a portion of the external airflow into the internal cooling circuit. In such a configuration, the electric motor may be designated in accordance IC 01 or IC 06 enclosure designations.

A possible advantage of the disclosure is that the electric motor can be selectively reconfigured between different enclosure configurations and to utilize cooling arrangements depending upon the duty service required of the motor. This and other possible advantages and features will be apparent from the following detailed description and accompanying drawings.

DETAILED DESCRIPTION

Figure 1:
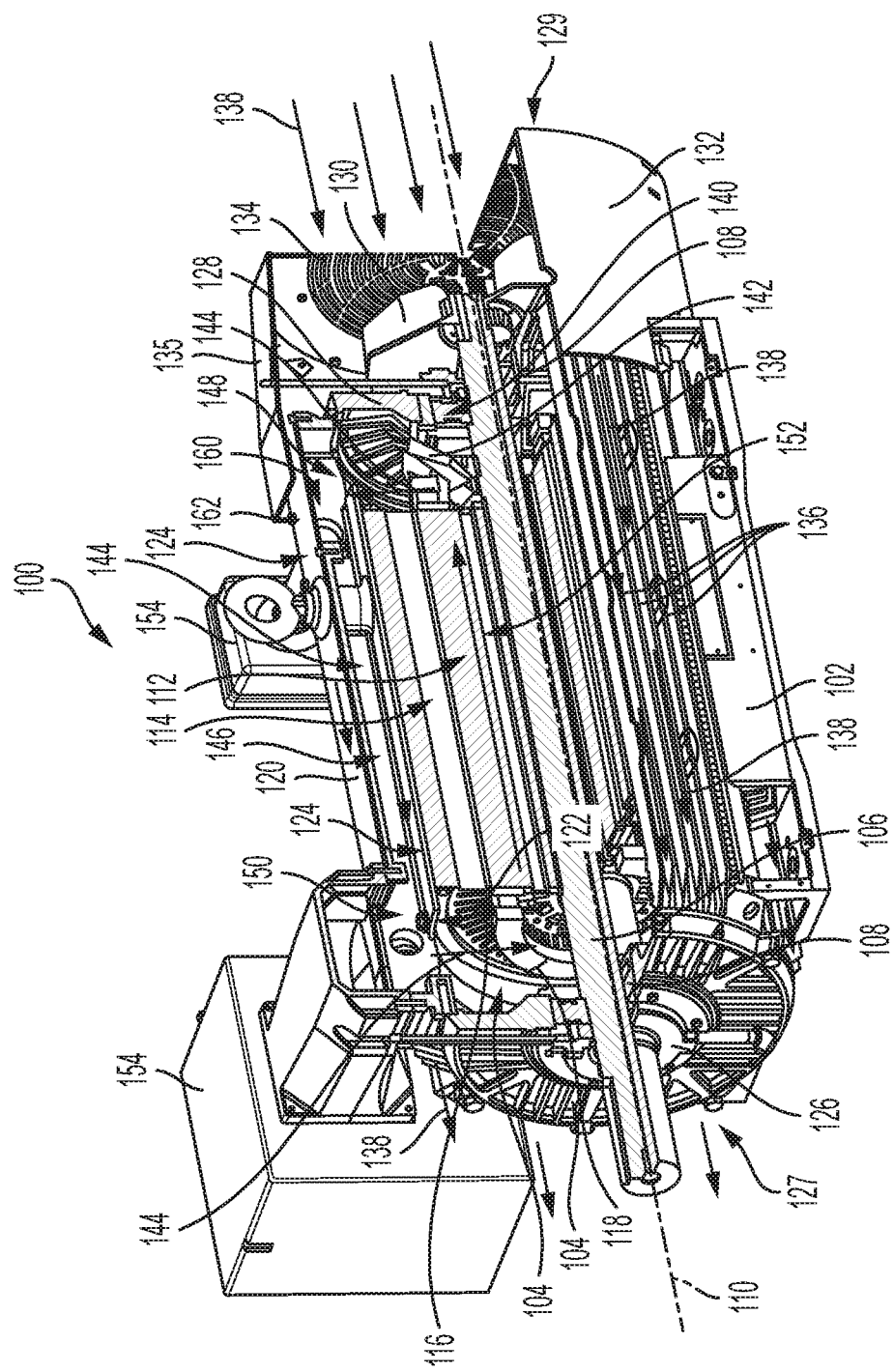
FIG. 1 is a cutaway view of an electric motor with a TEFC enclosure having an internal cooling circuit including an internal cooling channel and a removable cover plate selectively covering an enclosure aperture communicating with the internal cooling circuit.

Now referring to the drawings where, whenever possible, like reference numbers will refer to like elements, there is illustrated the external and internal components of an electric motor 100 designed in accordance with the present disclosure. Electric motors 100 convert electrical energy to mechanical torque that may be transmitted through a rotating shaft to be harnessed for other work. The electric motor 100 may be of any suitable construction and may utilize any suitable electromechanical operating principles such as, for example, an alternating current motor operating on single phase or poly-phase power. In the illustrated example, the electric motor 100 can include a housing or motor enclosure 102 that defines a hollow enclosed space 104 that may be generally cylindrical in shape for accommodating the internal active components of motor including a rotating motor shaft 106. The shaft 106 may be rotatably supported by the motor enclosure 102 through ball bearings 108 located at either axial end of the enclosure. The shaft 106 therefore extends along and defines a rotational axis 110 of the electric motor 100.

To rotate the shaft 106, a rotor 112 that may be generally cylindrical in shape is assembled to the shaft and may be made of a magnetic material. The rotor 112 is surrounded by an annular stator 114 that is fixedly mounted to the motor enclosure 102 such that both the rotor and stator are located in the enclosed space 104. The stator 114 can include a plurality of conductive windings made of, for example, copper wiring that may be received in a plurality of slots 116 aligned parallel with the rotational axis 110 and disposed radially into the inner annular surface of the stator 114.

When the conductive windings are connected to a source of alternating electrical power, they generate an electromagnetic field that can rotate circumferentially about the annular stator 114 and around the rotational axis 110. The rotating magnetic field can attract or induce a corresponding magnetic field in the rotor 112, causing the rotor 112 and shaft 106 to rotate with respect to the rotational axis 110 and the motor enclosure 102 via the bearings 108. To allow the rotor 112 to rotate with respect to the stator 114, the two elements are physically separated by an annular air gap 118 providing a clearance there between.

The motor enclosure 102 can include a hollow main body 120 that may extend radially around the rotational axis 110 and that defines the cylindrical enclosed space 104. The hollow main body 120 therefore includes an interior surface 122 delineating the cylindrical enclosed space 104 and an exterior surface 124 that may have different shapes and features. The main body 120 may be made of cast metal or sheet metal such as steel or aluminum. To isolate the enclosed space 104, a first enclosure end cap 126 can be located at and enclose one axial end of the hollow main body 120 and a similarly configured second enclosure end cap 128 can be located at and enclose the opposite second axial end. To mechanically couple the electric motor 100 to an external load, the shaft 106 can extend through the first enclosure end cap 126. The first enclosure end cap 126 can therefore correspond to a forward axial end 127 of the electric motor 100 and the second enclosure end cap 128 can correspond to a rearward axial end 129 of the electric motor. The main body 120 and the first and second enclosure end caps 126, 128 can be separately formed and assembly together using fasteners, welding techniques, or the like, or two or more of the components can be integrally formed by a common casting process.

As illustrated in FIG. 1, the motor enclosure 102 can have a TEFC configuration in accordance with an IC 411 designation in which the enclosed space 104 is substantially isolated from the ambient environment. To cool the electric motor 100 during operation, an exterior fan 130 may be mounted to a portion of the shaft 106 protruding through the second enclosure end cap 128. The exterior fan 130 can include a plurality of radially extending blades that can be disposed on an angle with respect to the rotational axis 110 to draw and direct air in a generally axial direction. To enclose the fan 130, a shell-like fan cover or fan shroud 132 can be mounted to the motor enclosure 102 proximate to the second enclosure end cap 128. The fan shroud 132 can include an axially oriented flow-through grate plate 134 arranged normal to the rotational axis 110 and having a plurality of vents that allow external air to be drawn into the fan shroud 132 upon rotation of the exterior fan 130. The fan shroud 132 can also include a peripheral casing 135 extending axially forward of the grate plate 134 generally circumferentially around the rotational axis 110. The peripheral casing 135 of the fan shroud 132 may be sized to fit around and overlap the second enclosure end cap 128 to provide radially arranged gaps or spaces with respect to the exterior surface 124 that allow for external airflow, as indicated by arrows 138, through the fan shroud over the main body 120 in the axial direction. To facilitate heat transfer to the external airflow, the exterior surface 124 of the main body 120 can include a plurality of external fins 136 aligned in parallel to the rotational axis 110. The external fins 136 axially direct the external airflow 138 along the exterior surface 124 toward the first enclosure end cap 126 to remove heat from the motor enclosure 102 by convection.

To provide further heat transfer from the electric motor 100 and promote cooling, the electric motor can include an internal cooling circuit 140 configured to circulate air internally in the enclosed space 104. By circulating internal air in the enclosed space, the thermal energy and heat are better distributed within the enclosed space 104 for conduction to the exterior surface 124 of the motor enclosure 102. The internal cooling circuit 140 can include an internal fan 142 mounted to the shaft 106 inside the enclosed space 104 at the rearward axial end 129 proximate the second enclosure end cap 128 of the electric motor 100. The internal fan 142 can be configured as a centrifugal fan that directs airflow from a centerline of the electric motor 100 aligned with the rotational axis 110 radially outwards toward the interior surface 122 of the main body 120. To direct the internal airflow, indicated by arrows 144, axially forward, the main body 120 of the motor enclosure 102 can include one or more internal channels 146 disposed therein. The internal channel 146 may be axially oriented and extend parallel to the rotational axis 106. The internal channel 146 can be formed in the main body 120 by the casting process and can be located between the interior surface 122 and the exterior surface 124 to be substantially distinct from the enclosed space 104. The internal channel 146 is therefore located radially outward of the rotor 112 and stator 114 and the internal airflow 144 in the internal channel can remove radially flowing thermal energy from those components by convention.

To receive and discharge the internal airflow 144, however, the internal channel 146 can communicate with the enclosed space 104 through a rear channel port 148 located proximate the rearward axial end 129 of the electric motor 100 and a forward channel port 150 located proximate the forward axial end 127. The axial extension of the rotor 112 and the stator 114 can be less than the axial length of the internal channel 146 so that the rearward channel port 148 and the forward channel port 150 have direct access to the enclosed space 104. The rearward and forward channel ports 148, 150 are disposed through the interior surface 122 of the main body 120 and enable the internal airflow 144 to be directed radially perpendicular to the rotational axis 110. To complete the internal cooling circuit 140 and circulate the internal airflow 144 back toward the rearward located internal fan 142, one or more rotor channels 152 can be axially disposed in the rotor 112 parallel to the rotational axis 110.

To establish an electrical connection between an electrical power source and the conductive windings on the stator 114 and, in the case of an externally excited alternating current motor, on the rotor 112, one or more terminal boxes 154 can be attached to the motor enclosure 102. In the illustrated embodiment, the terminal boxes 154 can be located along the top portion of the electric motor 100 and can define a pathway to the internal channel 146 so that conductive wires can be directed to the enclosed space 104. One terminal box 154 can be located toward the forward axial end 127 of the electric motor 100 to communicate with the forward channel port 150 and another terminal box 154 can be located toward the rearward axial end 129 of the electrical motor to communicate with the rearward channel port 148.

To maintain the TEFC configuration, the internal channel 146 typically remains isolated from the exterior environment surrounding the electric motor 100. However, to alter the enclosure configuration and the thermal cooling arrangement by selectively establishing fluid communication between the enclosed space 104 and an exterior fluid source, the motor enclosure 102 can include one or more enclosure apertures 160 disposed through it and operatively interfacing with the internal channel 146. In the illustrated example, the enclosure aperture 160 can be located toward the rearward axial end 129 of the electric motor 100 adjacent the second enclosure end cap 128 and can be located proximate to where the fan shroud 132 is mounted. The enclosure aperture 160 can be located where the rear channel port 148 intersects with the internal channel 146. As explained below, the location of the enclosure aperture 160 enables the enclosure aperture to divert a portion of the internal airflow 144 from the internal cooling circuit 140 or direct the external airflow 138 or other external fluid source into the internal cooling circuit. In the illustrated example, the enclosure aperture 160 can be disposed through the exterior surface 124 at the top of the main body 120 and oriented perpendicular to the rotational axis 106, but in other cases the enclosure aperture or additional enclosure apertures may be included at other locations.

To selectively seal the enclosure aperture 160, the electric motor 100 can include a removable cover plate 162 that can be mounted to the exterior surface 124 of the main body 120. The removable cover plate 162 can have a flat, planar shape and can be made of sheet metal or plate metal. The removable cover plate 162 can be placed adjacent to the exterior surface 124 and secured to the motor enclosure 102 by fasteners, for example, although other mounting techniques may also be utilized. When the removable cover plate 162 is mounted over the enclosure aperture 160, the electric motor 100 can operate according to the TEFC configuration with the internal cooling circuit 140 substantially isolated. When the removable cover plate 162 is dismounted from the motor enclosure 102, the enclosure aperture 160 provides access to the internal channel 146 and can allow fluid communication between the enclosed space 104 and an external fluid source.

Figure 2:
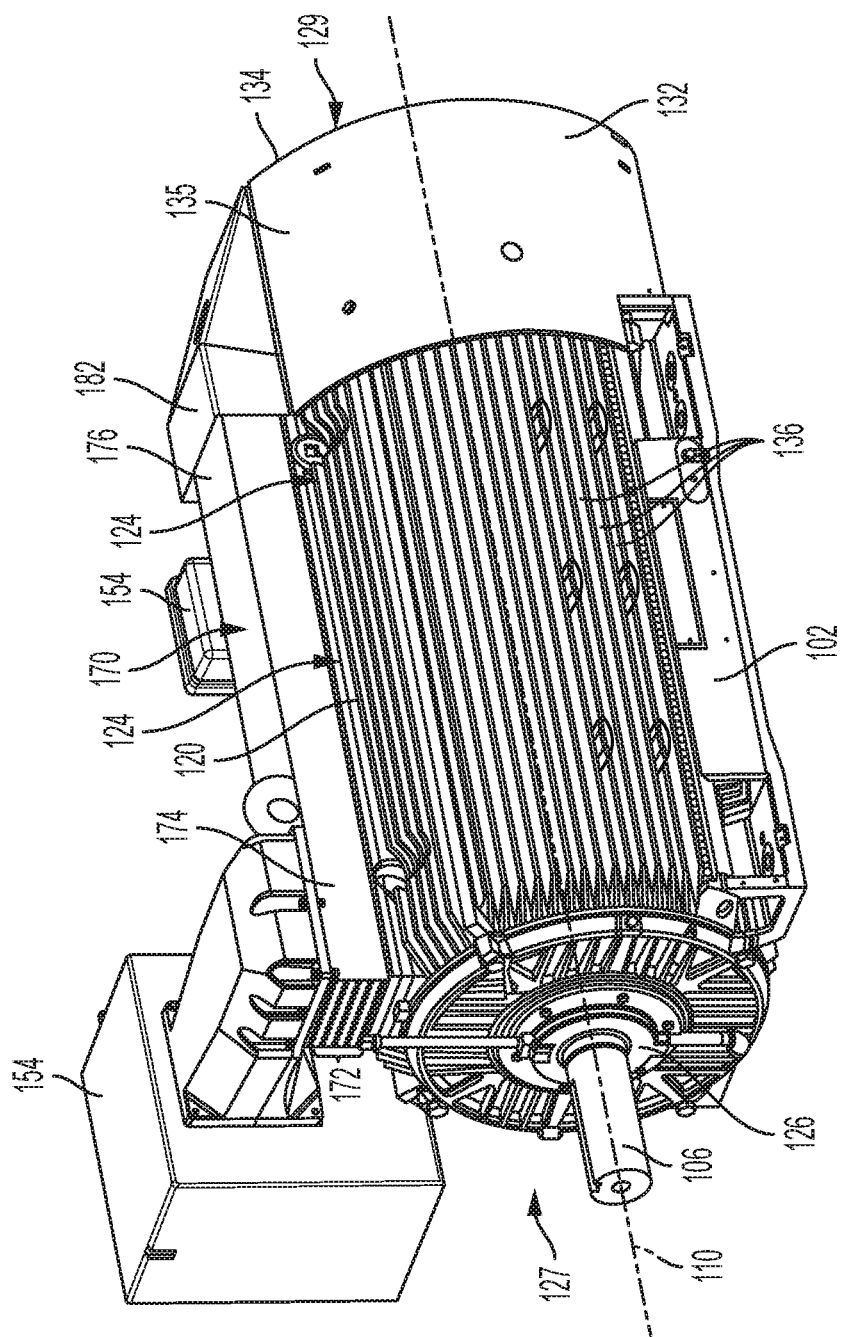
FIG. 2 is a perspective view of the electric motor of FIG. 1 with a heat exchanger selectively mounted to the motor enclosure and in fluid communication with the internal cooling circuit via the enclosure aperture.
Figure 3:
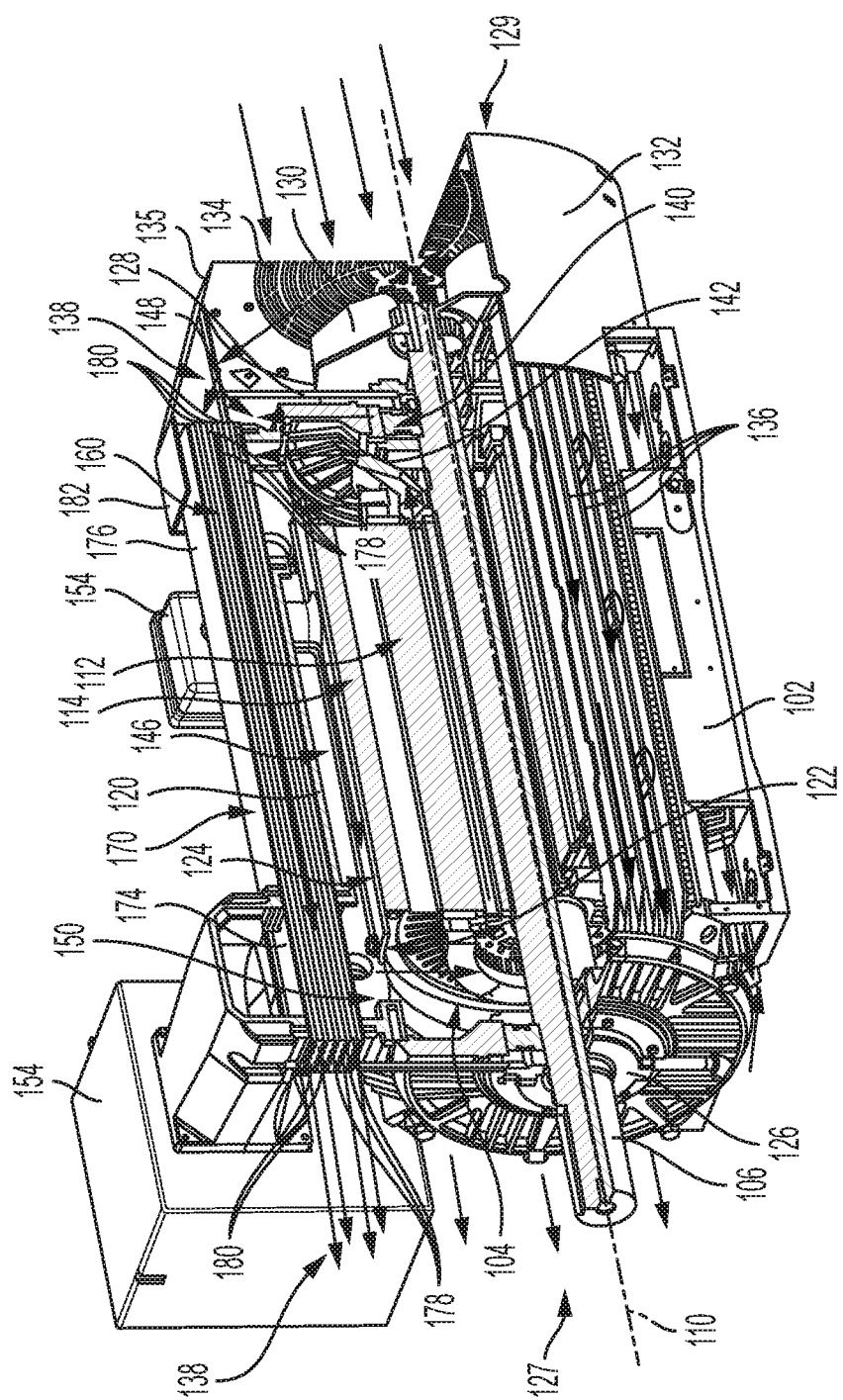
FIG. 3 is a cutaway view of the electric motor of FIG. 2 showing the interaction in the heat exchanger of the internal airflow and an external fluid flow from an external fluid source.

For example, referring to FIGS. 2 and 3, there is an example of the electric motor 100 operatively configured with a heat exchanger 170 that enables thermal interaction between the internal airflow 144 and the external fluid source. The heat exchanger 170 can be of a parallel flow configuration and can have an elongated structure that includes a plurality of linear passages or parallel fluid ducts 172 arranged adjacent to and separated from each other by duct walls. The plurality of parallel fluid ducts 172 therefore extend linearly between a first or forward exchanger end 174 and an opposite second or rearward exchanger end 176. The heat exchanger 170 can be mounted to the external surface 124 of the motor enclosure 102 and can be arranged axially along the top of the main body 120 between the forward axial end 127 of the electric motor 100 adjacent the first enclosure end cap 126 and the rearward axial end 129 of the electric motor adjacent the second enclosure end cap 128. In the illustrated embodiment, the heat exchanger 170 can be aligned in parallel with and extend over and above the internal channel 146 disposed in the structure of the main body 120.

To receive the heated internal airflow 144, the second exchanger end 176 of the heat exchanger 170 can be disposed over the enclosure aperture 160 where the internal channel 146 and the rear channel port 148 intersect. A first set or group 178 of the plurality of the fluid ducts 172 can selectively communicate with the internal channel 146 and a second group 180 of the plurality of fluid ducts 172 can be blocked or sealed from the internal channel 146. A portion of the internal airflow 144 that is radially directed outward by the internal fan 142 through the rearward channel port 148 can be diverted from the internal channel 146 and through enclosure aperture 160 to the heat exchanger 170 and into the first group 178 of the plurality of fluid ducts 172.

To receive the external airflow 138, the second group 180 of the plurality of fluid ducts 172 can be in fluid communication with the fan shroud 132 mounted to the second enclosure end cap 128. For example, the fan shroud 132 can include a shroud extension 182 that can project upwards and can extend over and accommodate the second exchanger end 176 of the heat exchanger 170. The shroud extension 182 can be formed by displacing an upper portion of the peripheral casing 135 upwards and slightly higher than the vertical height of the heat exchanger 170. The external airflow 138 drawn by the external fan 130 is therefore directed into the second group 180 of the plurality of fluid ducts 172 and can flow in parallel with the heated internal airflow 144 in the first group 178 of the plurality of fluid ducts 172 such that thermal energy is exchanged due to the temperature difference between the flowing fluids. For example, the thermal energy can transfer by conduction across the duct walls separating the first group 178 and the second group 180 of the plurality of fluid ducts 172. At the first exchanger end 174, the first group 178 of the plurality of fluid ducts 172 can be arranged to discharge the internal airflow 144 back into the internal channel 146 and thus into the enclosed space 104 via the forward channel port 150. The second group 180 of the plurality of fluid ducts 172 discharges the external air 138 axially forward from the first enclosure end cap 126.

A possible advantage of the foregoing arrangement is that the heat exchanger 170 enables thermal interaction between the external airflow 138 and the internal airflow 144 while maintaining the TEFC designation because the fluids remain isolated. Accordingly, the external airflow 138 is not able to enter the internal channel 146 and circulate to the enclosed space 104, or is otherwise allowed to intermix with the internal airflow 144, thus maintaining the TEFC configuration. Although the illustrated example of the heat exchanger 170 is a parallel flow arrangement, the heat exchanger may also be configured in a counter-flow arrangement. In another example, the heat exchanger 170 can be operatively configured to receive a liquid cooling solution, for example, ethylene glycol, from an external fluid source having a liquid reservoir and a pump or similar device to pressurize and direct the liquid to and through the second group 180 of the plurality of fluid ducts 172.

Figure 4:
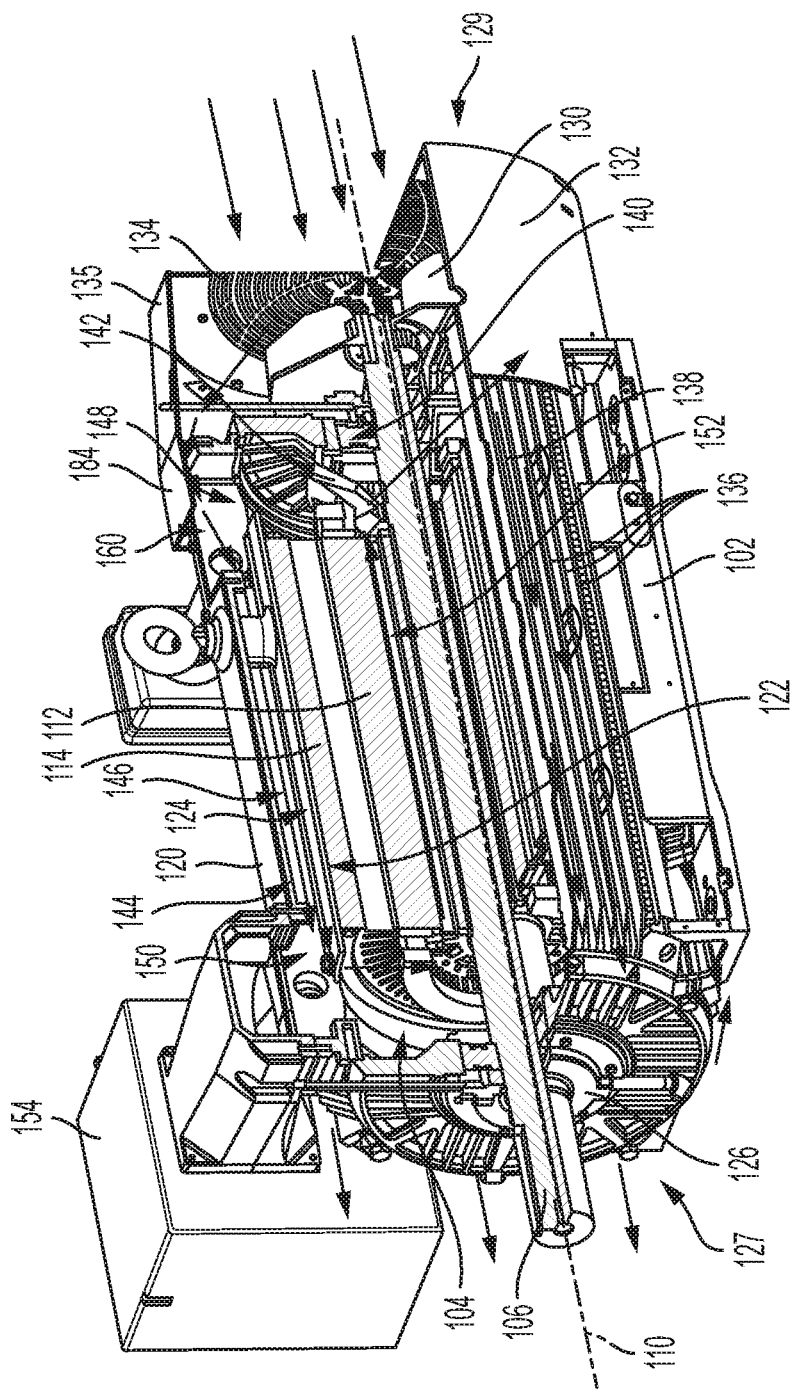
FIG. 4 is a cutaway view of the electric motor of FIG. 1 showing a configuration in which external fluid flow may be directed into the internal cooling circuit through the enclosure aperture by an external fan mounted to the rotor shaft.

Referring to FIG. 4, a configuration of the electric motor 100 is illustrated wherein the internal cooling circuit 140 is selectively configured to utilize external airflow 138 from an external fluid source. For example, in applications where the protection provided by a TEFC enclosure is unnecessary, the electric motor 100 can be selectively reconfigured to introduce a portion of the external airflow to the internal cooling circuit 140 to provide additional cooling and heat transfer. The electric motor 100 can be selectively switched to operate as an ODP configuration or in accordance with the IC 01 and/or IC 06 designations because the external airflow 138 is allowed to enter the enclosed space 104 and mix with the internal airflow 144 circulating therein. Accordingly, in FIG. 4, thermal interaction occurs by mixing the internal airflow 144 with a portion of the external airflow 138 or with fluid from another external fluid source.

For example, and as described above, to circulate and distribute internal airflow 144 within the enclosed space 104 of the motor enclosure 102, the internal cooling circuit 140 can include an internal fan 142 mounted to the shaft 106 at the rearward axial end 129 of the motor enclosure 102 located inside the second enclosure end cap 128. The internal fan 142 can be a centrifugal fan directing internal airflow 144 radially outwards to one or more internal channels 146 disposed in the main body 120 of the motor enclosure 102. As described above, the internal channel 146 can extend axially forward through the main body 120 parallel with the rotational axis 110 and is generally distinct from the enclosed space 104, communicating with the enclosed space 104 through a rearward channel port 148 and a forward channel port 150. The internal airflow 144 can be returned to the internal fan 142 via one or more rotor channels 152 axially disposed through the rotor 112 to complete the internal cooling circuit 140.

In the illustrated example, the external fluid source can include the external fan 130 mounted to the shaft 106 extending rearward from the second enclosure end cap 128 and located externally of the enclosed space 104. The external fan 130 can be accommodated in a fan shroud 132 and arranged to draw an external airflow 138 through the grate plate 134 and direct the external airflow axially forward over the exterior surface 124 of the main body 120 of the motor enclosure 102. To receive a portion of the external airflow 138 into the internal cooling circuit 140, the enclosure aperture 160 is disposed through the main body 120 and located where the second enclosure end cap 128 mounts to the motor enclosure 102. The enclosure aperture 160 is located at and establishes fluid communication with the intersection between the internal channel 146 and the rearward channel port 148 to the enclosed space 104. The enclosure aperture 160 can be associated with the selectively removable cover plate which, in the illustration of FIG. 4, has been unmounted from the exterior surface 124 of the main body 120. The portion of the fan shroud 132 that overlaps the rearward axial end 129 of the electric motor 100 can include a shroud extension 184 that can project upwards and partially over the enclosure aperture 160. For example, the shroud extension 184 can extend axially forward of the peripheral casing 135 associated with the fan shroud 132 and can be spaced above the second enclosure end cap 128 and the exterior surface 124 of the main body 120.

In operation, the external fan 130 can direct a portion of the external airflow 138 to the enclosure aperture 160 via the shroud extension 184. The shroud extension 184 directs the external airflow 138 axially forward over the second enclosure end cap 128 and downward into the enclosure aperture 160 where the external airflow aligns with and is received into the internal channel 146 of the internal cooling circuit 140. The internal airflow 144 initially directed radially outward by the internal fan 142 is then directed axially forward into the internal channel 146 and may assist in drawing and redirecting the axially flowing external airflow 138 from the external fan 130 into the internal channel. The external airflow 138 mixes with the internal airflow 144 in the internal channel 146 to provide additional cooling. The mixed airflows thereafter are directed through the remainder of the internal cooling circuit 140 and the enclosed space 104 to cool the internal components. To prevent pressure from increasing in the enclosed space 104 due to the added external airflow 138, one or more enclosure vents 186 can be disposed through the main body 120 to the ambient environment surrounding the electric motor 100. The enclosure vents 186 can be located at the rearward axial end 129 of the electric motor 100 proximate to where the main body 120 and the second enclosure end cap 128 join. Rotation of the centrifugal internal fan 142 can assist in directing a portion of the external airflow and internal airflow through the enclosure vents 186.

Figure 5:
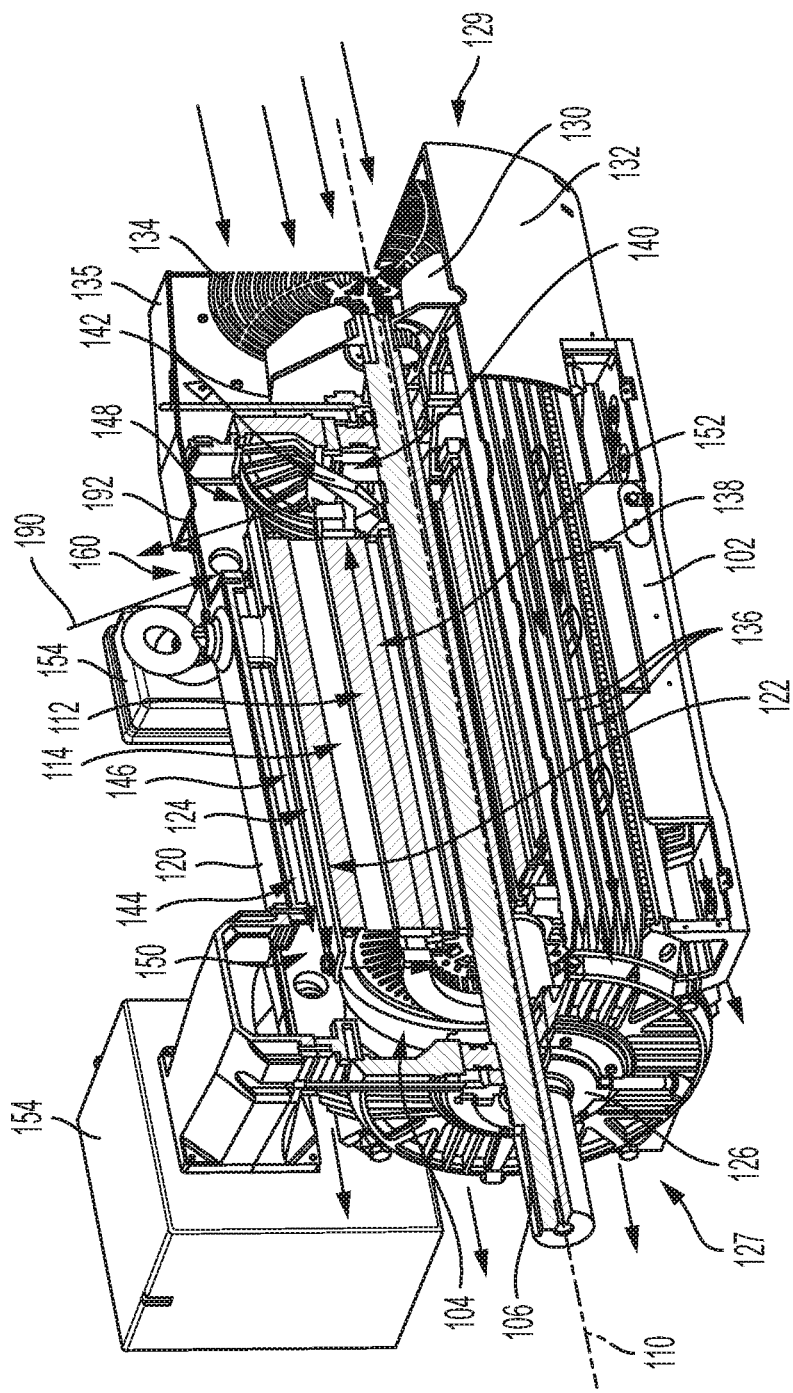
FIG. 5 is a cutaway view of the electric motor of FIG. 1 showing a configuration in which external fluid flow is directed into the internal cooling circuit through the enclosure aperture by forced ventilation.

Referring to FIG. 5, there is illustrated another example in which the electric motor 100 can be selectively configured to receive a distinct airflow, indicated by arrow 190, from another external fluid source into the internal cooling circuit 140 to provide additional cooling. For example, the distinct airflow 190 can be provided from a separately powered external fluid source such as a separate blower assembly 192 that may be located remotely from the electric motor 100. The blower assembly 192 can include a blower fan and an independent blower motor and may be located remotely from the electric motor 100. Accordingly, in the configuration of FIG. 5, the electric motor 100 can be selectively switched to operate as a TEFV enclosure or in accordance with the IC 17 designation since the distinct airflow 190 is introduced and may be forced into the enclosed space 104 and may mix with the internal airflow 144 circulating in the internal cooling circuit 140. Accordingly, in FIG. 5, thermal interaction occurs by mixing the internal airflow 144 with a portion of the distinct airflow 190.

In operation, the internal fan 142 can direct internal airflow 144 radially through the rearward channel port 148 to the internal channel 146 disposed through the main body 120 of the motor enclosure 102, which can direct the internal airflow axially forward to the forward channel port 150. To receive the distinct airflow 190, the enclosure aperture 160 is disposed through the top portion of the main body 120 adjacent to the second enclosure end cap 128. The enclosure aperture 160 is again proximate to and in fluid communication with the intersection between the internal channel 146 and the rearward channel port 148.

The separately powered external fluid source can be communicatively coupled to the enclosure aperture 160 through appropriate ductwork or a pipe connection. Accordingly, the distinct airflow 190 can be forcibly directed through the enclosure aperture 160 and redirected into the internal channel 146 to mix with the internal airflow 144 and be delivered to the enclosed space 104. The internal airflow 144 directed radially by the internal fan 142 through the rearward channel port 148 may encounter the distinct airflow 190 into the enclosure aperture 160 such that both proceed axially into the internal channel 146. To prevent pressure from increasing in the enclosed space 104, enclosure vents can be disposed through the main body 120 as described above or a return airflow, indicated by arrow 194, composed of a portion of the internal airflow 144 and the distinct airflow 190 can be redirected outward through the enclosure aperture 160, for example, by cyclic operation of the blower assembly that may be associated with the separately powered external fluid source.

In the example illustrated in FIG. 5, the second enclosure end cap 128 can be a solid component and can enclose or seal the enclosed space 104 from the external fan 130 and the region defined in the fan shroud 132. The external airflow 138 is therefore prevented from entering the enclosed space 104 and mixing with the internal airflow 144 of the internal cooling circuit 140. Accordingly, the present configuration of the electric motor 100 may retain some operational characteristics of a TEFC enclosure and may be configured as a TEFV or IC 017 enclosure.

Figure 6:
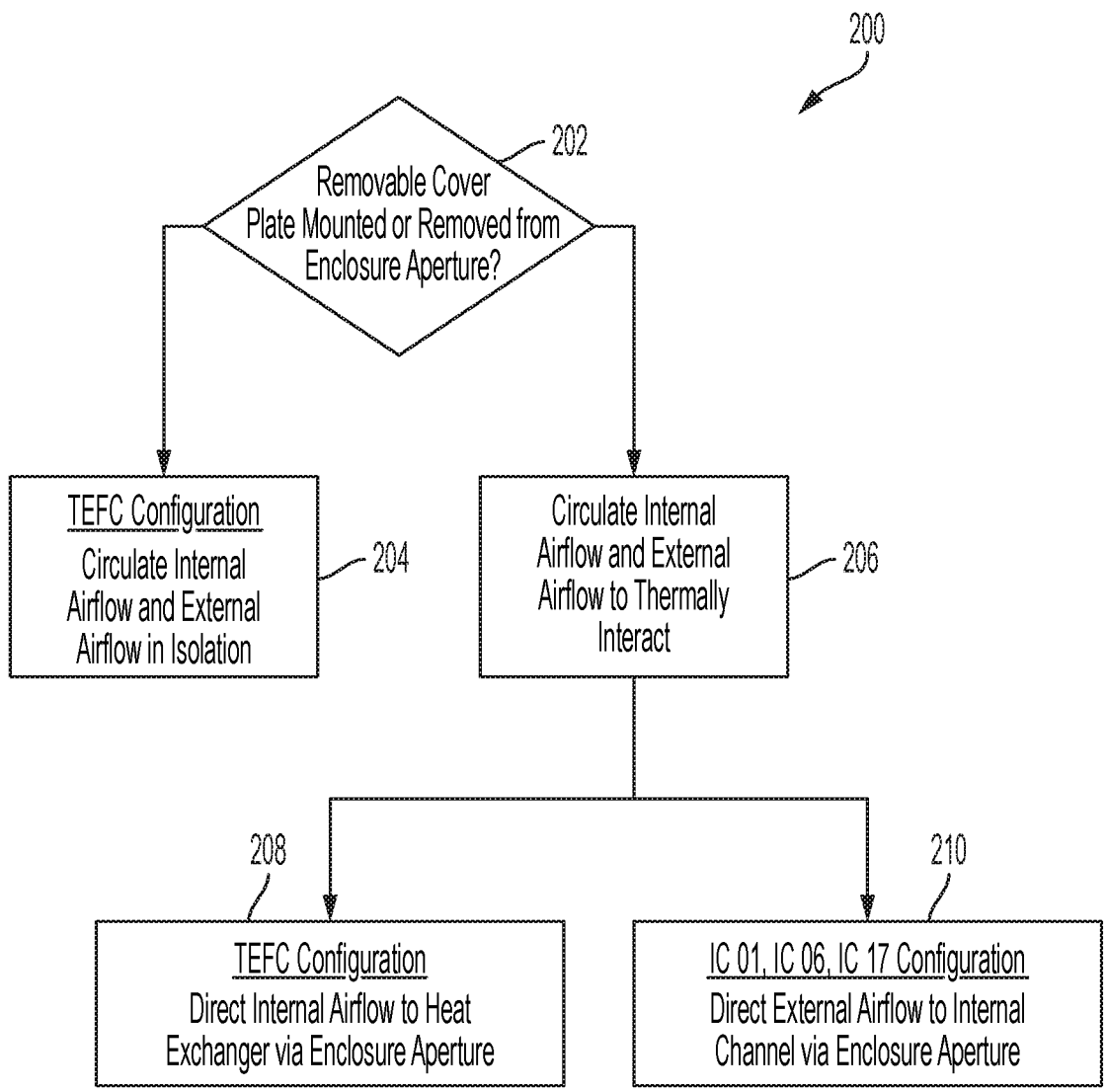
FIG. 6 is a flow diagram of a possible process of selectively configuring the electric motor to alter cooling arrangements and heat transfer.

Referring to FIG. 6, and in accordance with the prior figures, there is illustrated a flow diagram 200 depicting how the electric motor 100 may be selectively configured to alter the enclosure configuration and/or cooling arrangement. In an initial step 202, the removable cover plate 162 is either mounted to or removed from the motor enclosure 102 to cover or expose the enclosure aperture 160. If the electric motor 100 is intended to operate in an environment requiring certain protection, for example, from moisture or airborne debris, the removable cover plate 162 is mounted to cover the enclosure aperture 160 to result in a TEFC configuration 204. In the TEFC configuration 204, the internal airflow 144 is circulated in the internal cooling circuit 140 in isolation from the external airflow 138 directed over the motor enclosure 102 by the external fan 130.

If additional cooling is desired, in the initial step 202, the cover plate 162 can be removed from the enclosure aperture 160 and the internal airflow 144 can be arranged to thermally interact with an external fluid source, as indicated in configuration 206. Thermal interaction involves the exchange of thermal energy between the internal airflow 144 and another fluid source. For example, the heat exchanger 170 can be selectively mounted to the motor enclosure 102 proximately over the enclosure aperture 160 to receive a portion of the internal airflow 144 in a distinct first group 178 of fluid ducts 172. The heat exchanger 170 can also receive external airflow 138 from, for example, the external fan 130 in a distinct second group 180 of fluid ducts 172 flowing parallel with the internal airflow 144 such that thermal energy can be exchanged between the flows. In such an example, the electric motor 100 can maintain its designation as a TEFC configuration with increased thermal cooling.

Alternatively, if the protections associated with a TEFC designation are not necessary, the removable cover plate 162 can be removed and the motor can be operated in accordance with another designation such as ODP or IC 01, IC 06, or IC 17. For example, as indicated by configuration 208, the external airflow 138 can be directed into the enclosure aperture 160 to mix with the internal airflow 144. The external airflow 138 can be introduced from the external fan 130 or, in another example, the external airflow can be a distinct airflow 190 from a separately powered blower assembly 192. Thus, according to the flow diagram of FIG. 6, the electric motor 100 is configurable in a plurality of different cooling arrangements and enclosure styles.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. An electric motor comprising:
   a motor enclosure extending between a forward motor end and a rearward motor end, the motor enclosure including an interior surface and an exterior surface, the motor enclosure defining an enclosed space;
   a motor shaft extending between the forward motor end and the rearward motor end through the enclosed space, the motor shaft defining a rotational axis of the electrical motor;
   an external fan secured to and rotated by the motor shaft, the external fan accommodated in a fan shroud mounted to the rearward motor end;
   an internal cooling circuit including at least one internal channel for continuously circulating an internal airflow in the enclosed space between the forward motor end and the rearward motor end;
   a removable cover plate mountable to the exterior surface to cover at least one enclosure aperture disposed into the motor enclosure and in fluid communication with the internal channel, the enclosure aperture configured for selectively establishing thermal interaction between the internal airflow and an external airflow; and
   wherein the electric motor is selectively configurable for each of the following enclosure configurations:
   a first configuration with the removable cover plate removed, a heat exchanger selectively mountable to the exterior surface of the motor enclosure to cover the enclosure aperture, the heat exchanger including a plurality of fluid ducts including a first group of fluid ducts communicating with the internal channel via the enclosure aperture to receive the internal airflow and a second group of fluid ducts communicating with the external fan to receive the external airflow, wherein the first group of fluid ducts and the second group of fluid ducts extend parallel to the motor shaft from the forward motor end to the rearward motor end; and
   a second configuration with the removable cover plate removed from the at least one enclosure aperture disposed into the motor enclosure to establish thermal interaction between the internal airflow and the external airflow; and
   wherein the electric motor is configured with at least one of the enclosure configurations for cooling the electric motor in operation.

2. The electric motor of claim 1, wherein the internal channel is disposed through the motor enclosure parallel to the rotational axis and is distinct from the enclosed space, the internal channel communicating with the enclosed space via a rearward channel port and a forward channel port.

3. The electric motor of claim 2, wherein the enclosure aperture is located proximate the rearward motor end and is oriented radially with respect to the rotational axis.

4. The electrical motor of claim 3, wherein for the second configuration the fan shroud has a shroud extension extending at least partially over the enclosure aperture to direct external airflow from the external fan to the internal channel.

5. The electric motor of claim 1, wherein for the first configuration the heat exchanger extends between a forward exchanger end located proximate the forward motor end and a rearward exchanger end located proximate the rearward motor end and the heat exchanger is mountable to the enclosure housing so that the plurality of fluid ducts is arranged parallel to the motor axis.

6. The electric motor of claim 5, wherein the motor shaft protrudes from the rearward motor end.

7. The electrical motor of claim 6, wherein the fan shroud including a plurality of vents disposed there through and a shroud extension projecting outward with respect to the motor axis to overlap the rearward exchanger end.

8. The electrical motor of claim 1, wherein the internal cooling circuit includes an internal fan mounted to the motor shaft inside the motor enclosure.

9. The electric motor of claim 1, wherein the electric motor is selectively configured with the removable cover plate mounted to the exterior surface to cover the at least one enclosure aperture disposed into the motor enclosure to stop thermal interaction between the internal airflow and the external airflow.

10. The electric motor of claim 1, wherein for the second configuration the electric motor is further configured with a blower assembly comprising a blower fan and an independent blower motor and wherein the blower assembly is arranged in fluid communication with the enclosure aperture.

11. An electric motor selectively configurable between a totally enclosed fan cooled (TEFC) configuration and a configuration establishing thermal interaction with an external fluid source comprising:
   a motor enclosure extending between a forward motor end and a rearward motor end, the motor enclosure defining an enclosed space;
   a motor shaft extending between the forward motor end and the rearward motor end through the enclosed space, the motor shaft defining a rotational axis of the electrical motor;
   an internal cooling circuit including an internal fan mounted to the motor shaft to circulate an internal airflow in the enclosed space, the internal cooling circuit including at least one internal channel in the motor enclosure;
   an external fan mounted to the motor shaft protruding at the rearward motor end to direct an external airflow over an exterior surface of the motor enclosure, wherein the external fan is accommodated in a fan shroud;
   a removable cover mountable to the motor enclosure to selectively cover an enclosure aperture disposed there through, the enclosure aperture configured for selectively establishing thermal interaction between the internal airflow and an external airflow from an external fluid source; and
   wherein the electric motor is selectively configurable for each of the following enclosure configurations:
   a first configuration with the removable cover plate removed, a heat exchanger selectively mountable to the exterior surface of the motor enclosure to cover the enclosure aperture, the heat exchanger including a plurality of fluid ducts including a first group of fluid ducts communicating with the internal channel via the enclosure aperture to receive the internal airflow and a second group of fluid ducts communicating with the external fan to receive the external airflow, wherein the first group of fluid ducts and the second group of fluid ducts extend parallel to the motor shaft from the forward motor end to the rearward motor end; and
   a second configuration with the removable cover plate removed from the at least one enclosure aperture disposed into the motor enclosure to establish thermal interaction between the internal airflow and the external airflow;
   and
   wherein the electric motor is configured with at least one of the enclosure configurations for cooling the electric motor in operation.

12. The electric motor of claim 11, wherein for the second configuration the fan shroud has a shroud extension extending at least partially over the enclosure aperture to direct external airflow from the external fan to the internal channel.

13. The electric motor of claim 11, wherein for the first configuration the heat exchanger extends between a forward exchanger end located proximate the forward motor end and a rearward exchanger end located proximate the rearward motor end and the heat exchanger is mountable to the enclosure housing so that the plurality of fluid ducts are arranged axially parallel to the motor axis.

14. The electric motor of claim 13, wherein the fan shroud including a shroud extension projecting outward with respect to the motor axis to overlap the rearward exchanger end.

15. The electric motor of claim 11, wherein for the second configuration the electric motor is further configured with a blower assembly comprising a blower fan and an independent blower motor and wherein the blower assembly arranged in fluid communication with the enclosure aperture.

16. A method of selectively configuring an electric motor between a total enclosed, fan cooled (TEFC) configuration and a configuration establishing thermal interaction with an external fluid source comprising:
   externally directing an external airflow around an exterior surface of a motor enclosure with an external fan mounted to a shaft of the motor;
   internally circulating an internal airflow through an internal cooling circuit including at least one internal channel and at least one internal fan inside the motor enclosure;
   wherein selectively configuring the electric motor comprises:
   a first configuration formed by selectively removing a cover plate from an enclosure aperture disposed through the motor enclosure to establish fluid communication between the internal cooling circuit and the external fan, wherein the external fan directs a portion of the external airflow into the enclosure aperture to thermally interact with the internal airflow; and
   a second configuration formed by selectively removing the cover plate and selectively mounting a heat exchanger to the motor enclosure to cover the enclosure aperture, the heat exchanger including a plurality of fluid ducts with a first group of fluid ducts communicating with the at least one internal channel to receive the internal airflow and a second group of fluid ducts communicating with the external airflow, wherein the first group of fluid ducts and the second group of fluid ducts extend parallel to the motor shaft from the forward motor end to the rearward motor end, wherein at least one of the enclosure configurations is operational for cooling the electric motor.

* * * * *